United States Patent [19]

Manchester

[11] 3,938,816

[45] Feb. 17, 1976

[54] CHUCK OF THE INDEXING TYPE
[75] Inventor: William James Manchester, Durham, Conn.
[73] Assignee: PowerHold Products, Inc., Rockfall, Conn.
[22] Filed: Jan. 22, 1974
[21] Appl. No.: 435,435

[52] U.S. Cl. .......................... 279/5; 279/4; 279/121
[51] Int. Cl.² ........................................ B23B 31/34
[58] Field of Search ..................... 279/5, 1 J, 4, 121

[56] References Cited
UNITED STATES PATENTS

| | | | |
|---|---|---|---|
| 1,816,655 | 7/1931 | Ragan | 279/121 X |
| 2,660,440 | 11/1953 | Kurtz | 279/1 J |
| 2,972,487 | 2/1961 | Blackburn | 279/5 |

Primary Examiner—Donald R. Schran
Assistant Examiner—Z. R. Bilinsky
Attorney, Agent, or Firm—Prutzman, Hayes, Kalb & Chilton

[57] ABSTRACT

A chuck of the indexing type is comprised of a chuck housing, a pair of opposed jaw supports mounted within the housing with one of the supports being fixedly secured thereto and the other of the supports including an inclined cam surface and being movable toward and away from the fixed support. A jaw is mounted on each support through a live center and rotates relative to the support into any one of a number of indexed positions. A hydraulic jaw operator mounted on the housing includes a wedge drive engaging the cam surface of the movable support for driving the movable support and its associated jaw toward and away from the fixed support. Another feature of the invention is the provision for index locking means for each jaw mounted on the housing for locking the jaws against rotation. The rigidity of the chuck is enhanced by the chuck housing construction that includes a pair of substantially planar support plates rigidly interconnected in spaced parallel relationship with at least one of the plates having an enlarged central aperture of sufficient size to readily permit passage of a workpiece therethrough for engagement by the opposed jaws. One of the jaws of the chuck also may be provided with a plurality of fluid-operated work stabilizing clamps and a closed fluid circuit interconnecting the clamps for controlling engagement of the workpiece.

9 Claims, 4 Drawing Figures

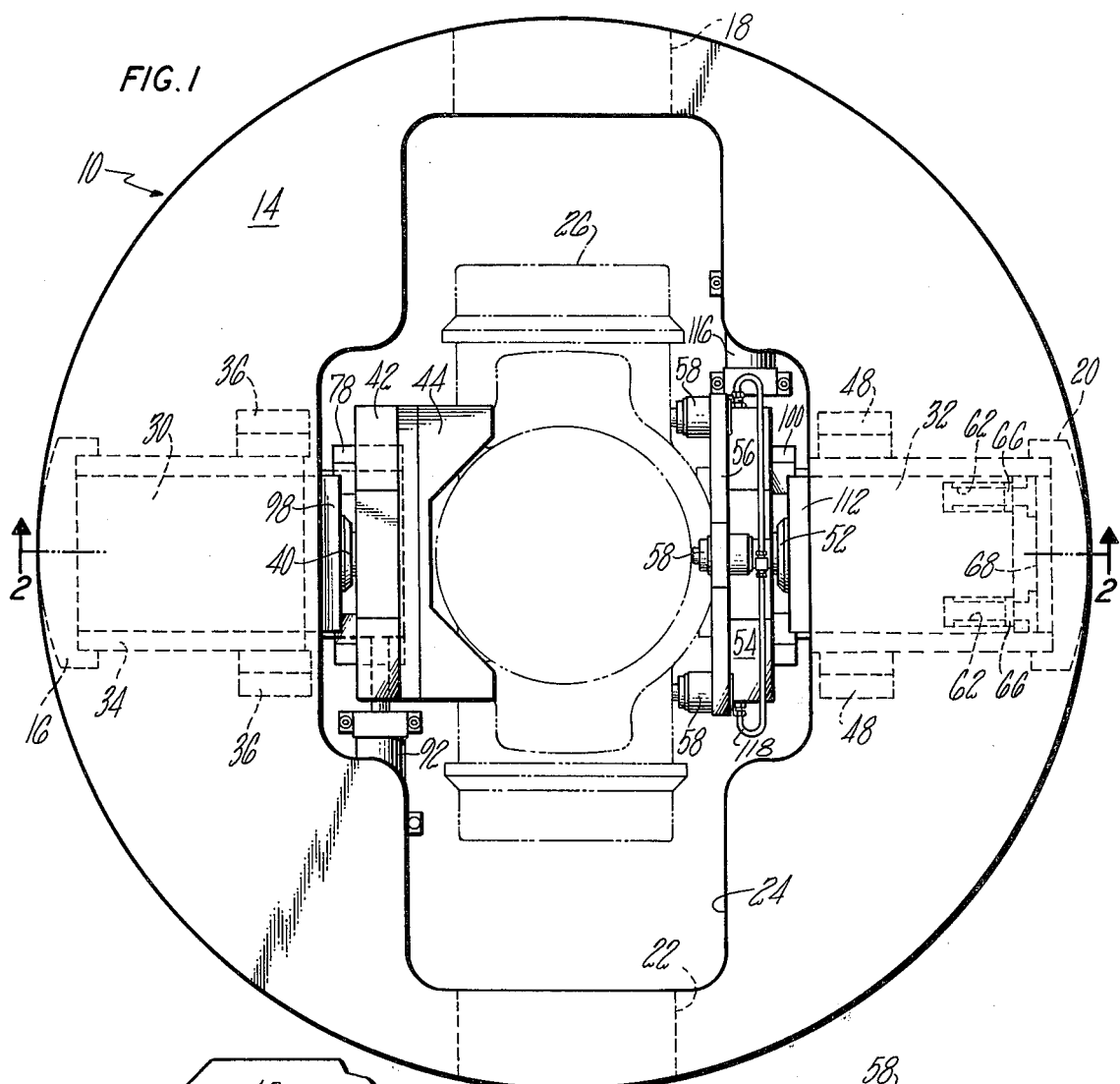
FIG. 1
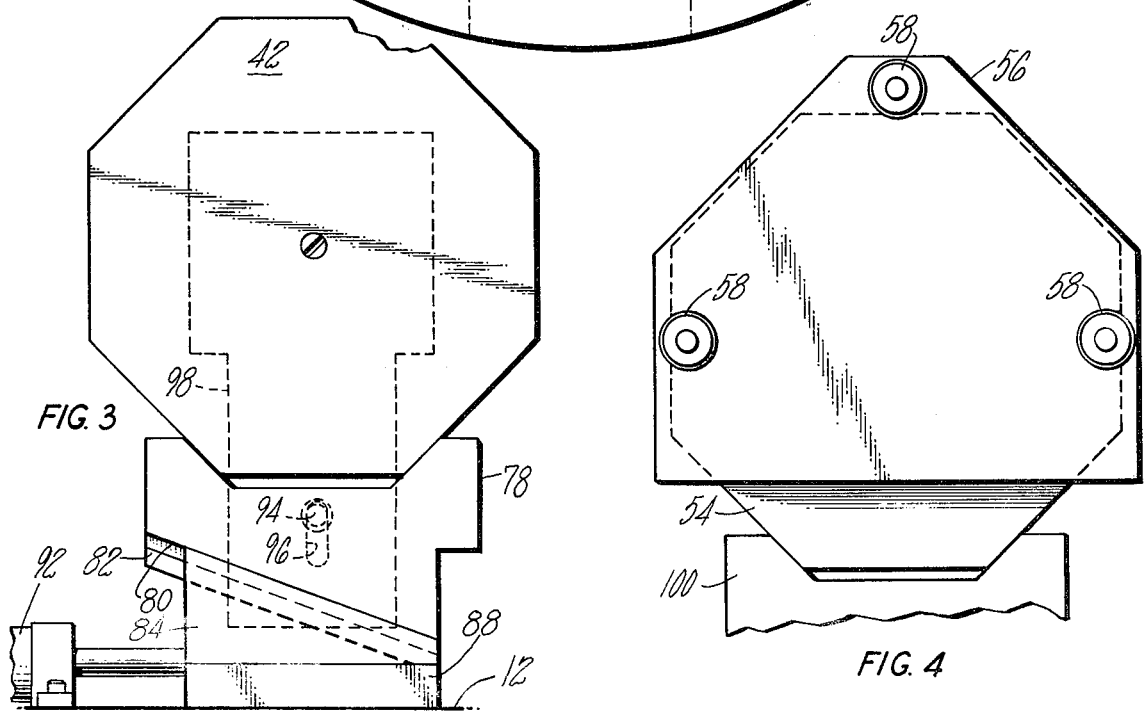
FIG. 3
FIG. 4

CHUCK OF THE INDEXING TYPE

BACKGROUND AND SUMMARY OF THE INVENTION

The present invention relates generally to chucks and is more particularly concerned with a new and improved chuck of the indexing type.

Indexing chucks are employed where it is desired to incrementally pivot a piece of work without releasing it from the chuck so that multiple operations such as machining operations may be performed thereon. These chucks conventionally include a pair of radially movable jaws for gripping the work and for rotating the work about the jaw axis through predetermined angles to present new faces or sides of the work to the machine tool operating thereon. Usually the chuck employs a pair of diametrically opposed gripping jaws that are each movable inwardly so as to grasp the workpiece under full jaw pressure yet are capable of being rotatably indexed and secured within each indexed position so as to present the appropriate surface of the workpiece to the machine tool. As will be appreciated, it is imperative that the workpiece be firmly and securely held by the chuck in each of its rotatably indexed positions.

Accordingly, a principle object of the present invention is to provide a chuck of the indexing type that insures maximum rigidity when the jaws close on the workpiece yet at the same time provides balanced jaw pressure at each point of jaw contact with the workpiece regardless of the indexed orientation of the jaws.

Another object of the present invention is to provide a chuck of the type described that includes an improved jaw closing mechanism wherein the power for moving the jaw is centered directly behind the jaw as it is closed on the workpiece and provides an equalized jaw pressure thereon. Included in this object is the provision for a chuck having an index locking mechanism that promotes rigidity between the jaw housing and the workpiece through the locking portions of the opposing jaw members.

Still another object of the present invention is to provide a new and improved indexing chuck of the type described that provides support for the workpiece gripping jaws not only along the axis of the jaws that are generally perpendicular to the direction of machine tool pressure but also in a direction that is directly opposed to the direction of machine tool pressure.

A still further object of the present invention is to provide an indexing chuck of the type described that provides the features mentioned hereinbefore yet is constructed of economical standard components without sacrificing durability, precision or desired operating characteristics within the chuck.

A further object of the present invention is to provide a chuck of the indexing type that utilizes a housing having rigidly interconnected top and bottom plates with the opposed jaws being firmly secured between the plates for added rigidity and with the indexed locking and supporting mechanism mounted on the plates and providing a wedging action that rapidly locks and unlocks the master jaws for indexing and further promotes the rigidity of the chuck construction when the jaws are locked in their indexed positions.

Other objects will be in part obvious and in part pointed out in more detail hereinafter.

These and related objects are accomplished in accordance with the present invention by providing a chuck of the indexing type comprising a chuck housing, a pair of opposed jaw supports mounted within the housing with one of the supports being fixedly secured thereto and the other of the supports including a cam surface and being movable toward and away from the fixed support. A jaw is mounted on each support for rotation relative thereto into any one of a number of indexed positions. A jaw operator mounted on the housing includes drive means engaging the cam surface of the movable support for driving the movable support and its associated jaw toward and away from the fixed support. Another feature of the invention is the provision for index locking means for each jaw mounted on the housing for locking the jaws against rotation. The rigidity of the chuck is enhanced by the chuck housing construction that includes a pair of substantially planar support plates rigidly interconnected in spaced parallel relationship with at least one of the plates having an enlarged central aperture of sufficient size to readily permit passage of a workpiece therethrough for engagement by the opposed jaws. One of the jaws of the chuck also may be provided with a plurality of fluid-operated work stabilizing clamps and a closed fluid circuit interconnecting the clamps for controlling engagement of the workpiece thereby.

A better understanding of the invention will be obtained from the following detailed description and the accompanying drawings which set forth an illustrative embodiment indicative of the way in which the principles of the invention are employed.

A BRIEF DESCRIPTION OF THE DRAWINGS

In the drawings:

FIG. 1 is an elevational view of an indexing chuck incorporating the features of the present invention;

FIG. 3 is a sectional view taken along the line 3—3 of FIG. 2 illustrating the fixed master jaw and index locking mechanism therefore; and, FIG. 4 is a sectional view taken along the line 4—4 of FIG. 2 illustrating the movable master jaw and associated mechanism.

DESCRIPTION OF A PREFERRED EMBODIMENT

Figure 2:
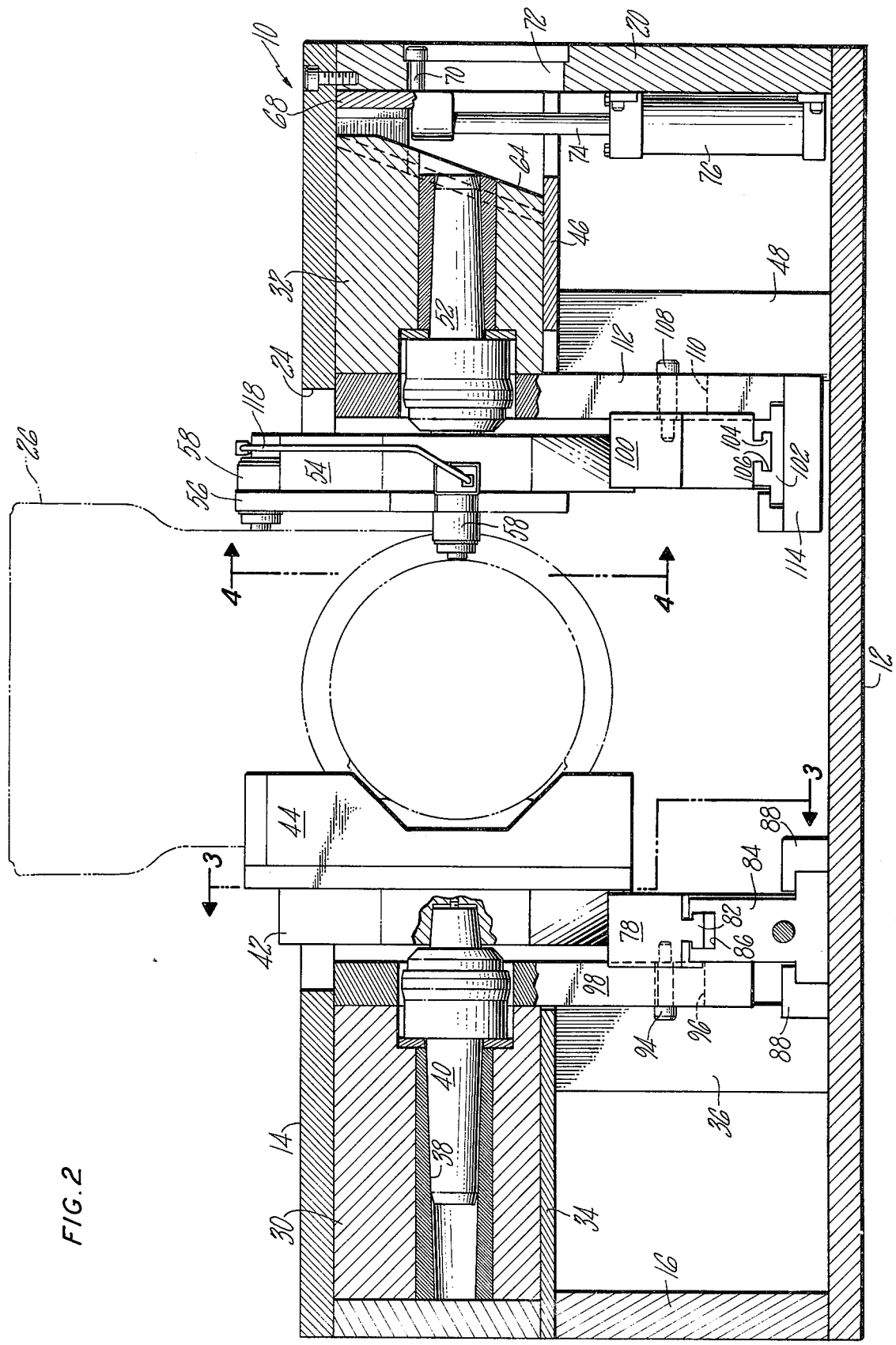
FIG. 2 is a sectional view, partially broken away, taken along the line 2—2 of FIG. 1.

Referring now to the drawings in greater detail wherein like reference numerals indicate like parts throughout the several figures, there is illustrated a chuck 10 of the indexing type comprised of a cylindrical chuck body formed from a circular, substantially flat base plate 12 and a complementary circular top plate 14 spaced from the base plate and fixed in substantial parallelism thereto by means of four equally spaced peripheral support members 16, 18, 20 and 22. The top plate 14 is provided with a large generally rectangular central aperture 24 of sufficient size to permit the passage therethrough of a workpiece to be gripped by the chuck, such as the valve body 26. As will be appreciated the aperture 24 must also be of sufficient size to permit indexed rotation of the workpiece by the chuck so that appropriate tooling operations can be performed on various angularly spaced portions thereof. Thus in the specific embodiment illustrated the generally rectangular central aperture 24 exhibits longitudinal and transverse dimensions well in excess of the size of valve body 26 and sufficiently large to accommodate indexed rotation of the workpiece as it is held by the chuck.

A pair of opposed jaw supports 30, 32 are mounted on diametrically opposite sides of the elongated central aperture 24 immediately adjacent the underside of the top plate 14 and in spaced relationship to the circular bottom plate 12. Jaw support 30 is fixedly positioned and rigidly secured within a housing 34 secured at its outer end to the peripheral support 16 and at its inner end by a pair of support posts 36 extending between the top and bottom plates. The jaw support 30 is provided with an axially extending aperture 38 within which is seated a live center 40 that mounts a fixed master jaw 42. As shown in FIG. 3, the fixed master jaw 42 is of octagonal configuration and, in turn, mounts a jaw adapter 44 configured so as to properly engage the particular workpiece being held by the indexing chuck. Thus in the specific embodiment illustrated, a jaw adapter 44 suited for contacting the valve body 26 at six spaced pad locations is fixedly secured to the master jaw 42 for indexed rotation therewith about the radially extending axis of the live center 40.

The opposed jaw support 32 is also mounted within an individual housing 46 secured to the peripheral support 20 and to a pair of support posts 48 fastened to the top and bottom plates of the chuck body. However, unlike support 30 the support 32 is slideably movable within the housing 46 toward and away from the fixed support 30 to effect opening and closing of chuck jaws. The support 32 includes a live center 52 mounted in coaxial alignment with the live center 40 carried by the fixed jaw support 30 and mounts a movable master jaw 54 which, in the illustrated embodiment, supports a jaw adapter plate 56 and three hydraulically operated, work-engaging clamps 58 disposed within a tripod-like array.

As mentioned, the jaw support 32 and its associated master jaw 54 are adapted for axial movement toward and away from the fixed or stationary jaw 42 located at the opposite side of the workpiece receiving aperture 24. The movable jaw support 32 includes a pair of spaced drive tracks 62 located along the inclined rear wall 64 of the jaw support. The tracks 62 are positioned adjacent opposite sides of the support and slideably receive the drive rails 66 on the free ends of a U-shaped driving plug 68 adapted for reciprocating movement along support 20 in a plane transverse to the axis of movement of the movable support 32. The plug 68 also includes a guide pin 70 keyed with the slot 72 in support 20 to control reciprocal movement thereof. The plug 68 is reciprocally driven toward and away from top plate 14 by a drive rod 74 associated with a hydraulic cylinder 76 mounted on support 20. The movable jaw support 32 thus is driven radially inwardly along its housing as the jaw drive plug 68 moves toward the top plate 14. As mentioned, the pin 70 positioned within the elongated slot 72 of the bracing member 20 travels therealong to maintain the jaw drive plug 68 in its appropriately centered position while the interengaged tracks 62 and rails 64 provide a smooth slideable driving action for closing and opening of the jaws.

Both the movable master jaw 54 and the fixed master jaw 42 are rotatable about their coaxially aligned live centers 40 and 52 and are provided with substantially identical index locking mechanisms with the exception that the index locking mechanism for the movable master jaw 54 is appropriately supported so that it will travel radially with the movable jaw as it moves toward and away from the fixed master jaw. These index locking mechanisms also provide an auxiliary jaw support function as will be more fully understood hereinafter.

As illustrated in FIGS. 2 and 3, the index locking mechanism for fixed jaw 42 comprises a jaw engaging block 78 configured so as to supportably engage the jaw at two spaced locations about the periphery thereof. The block 78 is mounted between the octagonal master jaw 42 and the base plate 12 of the housing and is disposed within substantially the same plane as the jaw 42 thereby relieving the live center 40 of some of the jaw load and directly opposing the tool pressure produced by boring and turning operations. The side 80 of block 78 facing the back plate 12 is provided with an elongated rail-like portion 82 disposed at an inclined angle to the plate 12. A sliding wedge-like member 84 is provided with a complementary recess 86 for receiving the rail 82 and is slideably mounted on the bottom plate 12 by means of a pair of guide members 88. The wedge drive member 84 is reciprocably driven by a hydraulic cylinder 92 and the support block 78 is keyed for linear movement away from or toward the master jaw 42 through the cooperative interaction of a pin 94 carried by the block 78 and an elongated slot 96 in a guide bar 98 fixed to the jaw support 30. Consequently as the wedge 84 is driven to the right as viewed in FIG. 3, it drives the block 78 toward the jaw 42 until it lockably engages the jaw for retention within a specific indexed orientation. Conversely, wedge movement to the left as viewed in FIG. 3 unlockably releases the master jaw 42 for further indexing.

As mentioned, the movable master jaw 54 is also provided with an indexed locking mechanism substantially identical to the mechanism used for the fixed jaw except that the indexed locking mechanism for the movable jaw is constructed so as to move with the movable jaw toward and away from the fixed jaw 42. Thus the indexed locking mechanism for the movable jaw 54 includes a jaw engaging block 100 substantially identical in configuration to the block 78 for the fixed jaw and a wedge-like drive member 102 interconnected with the block through the cooperative interaction of a rail-like portion 104 on the block 100 and a track 106 within the sliding drive wedge member 102. A pin 108 secured to the block 100 coacts with an elongated slot 110 in a guide bar member 112 secured to the movable jaw support 32 to control linear movement of the block 100 toward and away from the master jaw 54. The guide bar 112 is also provided with a transversely extending base portion 114 which defines a guideway for the sliding wedge drive member 102 to assure its proper orientation relative to the block 100 so as to permit cooperative driving engagement between the rail 104 and track 106 of the respective members. The transversely extending base 114 of the guide bar 112 also supports a hydraulic cylinder 116 (FIG. 1) adapted to actuate the sliding wedge drive member 102 in substantially the same fashion as the hydraulic cylinder 92 of the index control unit for the fixed master jaw 42.

As mentioned, the jaw adapter 44 mounted on the stationary master jaw 42 will contact the valve body 26 at six pad locations. However, the movable jaw has an adapter 56 that provides three-point contact with the workpiece and is capable of adjustment to accommodate variations in the shape of the particular workpiece held by the jaws. Thus, as illustrated in FIGS. 1 and 2 the jaw adapter 56 mounted on the movable master jaw 54 includes three similar hydraulic cylinders or clamping members 58 that are interconnected with each other through a closed hydraulic circuit 118. In this manner each of the clamping cylinders 58 can adjust to slight variations in the configurations of the workpiece and at the same time provide equal pressure contact at the three remote contact locations thus assuring that the jaw pressure applied to the workpiece is uniform and a firm clamping action is achieved.

As mentioned hereinbefore, it is also a feature of the present invention that the structure hereinbefore described provides not only substantial rigidity within the chuck assembly but achieves this desired result while using standard components such as standard hydraulic cylinders to power the movable jaws and the index locking mechanism. Standard live centers are also used and serve as spindles for indexing the workpiece into the desired rotational position relative to the machining tool. Additionally the dual plate construction of the chuck body obviates the need for heavy castings or forgings without sacrificing strength, durability or rigidity. It is also an advantage of the present invention that the jaw closing and indexing mechanisms utilize a wedging action such that the entire unit reinforces the rigidity of the structure as it clamps the workpiece and makes it practically impossible for the jaw to move after it has gripped the workpiece.

As will be appreciated by persons skilled in the art, various modifications, adaptations and variations of the foregoing specific disclosure can be made without departing from the teachings of the present invention.

I claim:

1. A chuck of the indexing type for holding a large workpiece weighing up to about 2,000 pounds comprising a pair of substantially planar support plates rigidly interconnected in spaced parallel relationship and consisting of a base plate and a top plate having an enlarged central aperture of sufficient size to readily permit passage of a workpiece therethrough, a pair of opposed jaw supports mounted between said plates adjacent the periphery of said aperture, a housing for each of said jaw supports fixedly positioned and rigidly supported between said plates, one of said jaw supports being slidably movable within said housing relative to said plates toward and away from the other support, said jaw supports including live centers positioned coaxially along the axis of movement of said movable support, a jaw mounted on each live center for indexed rotation relative to said supports into any one of a number of indexed rotary positions, a jaw support operator mounted on the housing between said plates and having wedge-like drive means in alignment with said live centers for driving said movable support and associated jaw toward and away from said other jaw and support for clampably engaging and releasing a workpiece positioned between the jaws, and jaw locking means supportably mounted on the base plate and directly engaging the jaws to provide support for the jaws in a direction normal to the base plate and directly opposite machine tool pressure on the workpiece, said locking means rigidly immobilizing the indexed jaws against rotation and readily releasing the jaws for indexed rotation.

2. The chuck of claim 1 wherein said movable jaw support includes an inclined track and said wedge-like drive means includes a track follower for driving said movable support toward said other support during movement of the follower along the inclined track.

3. The chuck of claim 2 including a reciprocal hydraulic drive connected to the track follower for driving it along the inclined track.

4. The chuck of claim 1 wherein the locking means includes a jaw engaging member reciprocably movable toward the jaw for lockable engagement therewith and a wedge-like drive member for driving the jaw engaging member into locking engagement with the jaw.

5. The chuck of claim 4 wherein said drive member is fluid operated and said locking means at least partially supports the jaw when the jaw is locked in one of said indexed rotary positions.

6. The chuck of claim 1 wherein the locking means include separate locking members for each jaw supported on said base plate and the locking member for the movable jaw is movable therewith.

7. The chuck of claim 1 wherein one of said jaws has a plurality of fluid-operated work stabilizing clamps for both locating and gripping the workpiece and a fluid circuit interconnecting said stabilizing clamps for controlling engagement of the workpiece thereby and equalizing pressure on the workpiece.

8. The chuck of claim 7 wherein the fluid circuit is a closed hydraulic circuit adapted to equalize hydraulic pressure on the workpiece by the stabilizing clamps.

9. The chuck of claim 7 wherein the work stabilizing clamps include at least three fluid operated cylinders movable toward and away from a workpiece located between the opposed jaws.

* * * * *